US006995760B1

(12) United States Patent
Horiike

(10) Patent No.: US 6,995,760 B1
(45) Date of Patent: Feb. 7, 2006

(54) EDITING METHOD AND MEDIUM IN CAD SYSTEM

(75) Inventor: Atsushi Horiike, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 876 days.

(21) Appl. No.: 09/639,763

(22) Filed: Aug. 15, 2000

(30) Foreign Application Priority Data

Mar. 16, 2000 (JP) .............................. 2000-074123

(51) Int. Cl.
*G06T 15/00* (2006.01)
(52) U.S. Cl. ..................... 345/419; 345/581; 715/852; 715/860; 715/864; 700/96; 700/98
(58) Field of Classification Search ................ 345/964, 345/629, 852, 860, 419, 581; 700/96, 98, 700/182; 715/852, 860, 864
See application file for complete search history.

(56) References Cited

U.S. PATENT DOCUMENTS 5,497,452 A * 3/1996 Shimizu et al. ............. 345/420

5,828,575 A * 10/1998 Sakai ........................ 700/182

OTHER PUBLICATIONS

Using AutoCAD release 10 with 3-D, James Fuller, 1989, Delmar, 3rd edition, chapter 6 pp. 6-6 to 6-8, 14 pp. 14-24 to 14-25, 16,19.*

* cited by examiner

*Primary Examiner*—Kimbinh T. Nguyen
(74) *Attorney, Agent, or Firm*—Staas & Halsey LLP

(57) ABSTRACT

Disclosed is a technology of making a user grasp and specify a basic configuration invisible in a finally generated three-dimensional configuration in a three-dimensional CAD system for generating the three-dimensional configuration by sequentially combining the basic configurations. A solid editing method in the three-dimensional CAD system for completing the three-dimensional configuration through a process of combining a plurality of basic configurations displayed on a display screen with an operation unit, comprises a step of displaying in-the-making configurations from a first basic configuration as a start configuration down to the final three-dimensional configuration, a selecting step of selecting one of the basic configurations displayed, and a step of setting, as an edit target, the basic configuration finally combined with respect to the selected in-the-making configuration.

15 Claims, 18 Drawing Sheets

| BASIC CONFIGURATION 100 | |
|---|---|
| POINTER TO NEXT ELEMENT | |

31

| POINTER TO NEXT ELEMENT | |
|---|---|
| NAME | RECTANGULAR PARALLELOPIPED S |
| CATEGORY | TWO-DIMENSIONAL GRAPHIC SWEEP CONFIGURATION |
| TWO-DIMENSIONAL GRAPHIC | CLASSIFICATION = POLYGON, NUMBER OF APEXES = 4 COORDINATES=(x1, y1), (x2, y2), (x3, y3), (x4, y4), (x1, y1) |
| DEPTH | W1 |
| APPLICATION METHOD | OR |
| COMMENT | FOR FOUNDATION |

31

| POINTER TO NEXT ELEMENT | |
|---|---|
| NAME | ROUND HOLE H1 |
| CATEGORY | SWEEP HOLE |
| TWO-DIMENSIONAL GRAPHIC | CLASSIFICATION = CIRCLE, RADIUS = R |
| DEPTH | W2 |
| APPLICATION METHOD | OR |
| COMMENT | PREPARATORY HOLE |

31

| POINTER TO NEXT ELEMENT | |
|---|---|
| NAME | RECTANGULAR HOLE H2 |
| CATEGORY | SWEEP HOLE |
| TWO-DIMENSIONAL GRAPHIC | CLASSIFICATION = POLYGON, NUMBER OF APEXES = 4 COORDINATES=(x5, y5), (x6, y6), (x7, y7), (x8, y8), (x5, y5) |
| DEPTH | W2 |
| APPLICATION METHOD | OR |
| COMMENT | HOLE FOR FITTING |

31

| POINTER TO NEXT ELEMENT = NULL | |
|---|---|
| NAME | CUTTING |
| CATEGORY | SHEET-CUT |
| TWO-DIMENSIONAL GRAPHIC | CLASSIFICATION = POLYGONAL LINE, NUMBER OF APEXES = 2 COORDINATES=(x10, y10), (x10, y10) |
| DEPTH | UNUSED |
| APPLICATION METHOD | DELETION OF LEFT SIDE |
| COMMENT | DELETION OF UNNECESSARY PORTION |

EDITING METHOD AND MEDIUM IN CAD SYSTEM

BACKGROUND OF THE INVENTION

The present invention relates to a three-dimensional CAD (Computer Aided Design) system.

In the three-dimensional CAD system, basic configurations such as a rotary body, a protrusion, a hole, etc. (which are called features) are defined. Then, a user creates a final three-dimensional configuration by combining the defined basic configuration in a specified sequence. In the three-dimensional CAD system, such a method has hitherto been generally adopted. This type of CAD is known as a feature-based CAD system. FIGS. 17 and 18 show examples of the basic configurations described above. For example, a sweep may be defined as a basic configuration of a locus depicted when a two-dimensional graphic moves a predetermined distance. Further, the rotary body is a basic configuration of a locus depicted when the two-dimensional graphic rotates about a predetermined axis.

Moreover, in the three-dimensional CAD system, it might often happen that after the three-dimensional configuration has been temporarily generated and again changed. In such a case, it is required that a combination sequence of the already-added basic configuration be changed other than further adding the basic configuration to the final configuration. It is also required that the basic configuration be deleted and reproduced, and its shape and attribute be also changed.

For changing the three-dimensional configuration described above, the respective basic configurations for forming the three-dimensional configuration have hitherto been specified as follows:

(1) The basic configuration is specified by selecting the basic configuration appearing in the final three-dimensional configuration (such as pointing it with a mouse pointer, etc.).

(2) A feature tree for indicating a combination sequence of the basic configurations is displayed, and the basic configuration is specified by selecting the basic configuration expressed in the feature tree.

According to the method (1), however, there might be a case where all the basic configurations combined are invisible in the final three-dimensional configuration. For instance, if the final three-dimensional configuration is obtained by cutting a part of an in-the-making three-dimensional configuration, a basic configuration contained in the cut-off portion does not appear in the final three-dimensional configuration. It is therefore unfeasible to select the basic configuration contained in the cut-off portion.

Further, according to the method (2), the user is unable to grasp the in-the-making three-dimensional configuration and the basic configuration to be added. Hence, there might be induced a mis-operation such as changing the basic configuration that the user does not intend, and so forth.

SUMMARY OF THE INVENTION

It is a primary object of the present invention, which was devised to obviate the problems inherent in the prior art, to provide a function of making a user grasp and specify a basic configuration invisible in a final three-dimensional configuration in a three-dimensional CAD system for creating a three-dimensional configuration by sequentially combining the basic configurations.

It is another object of the present invention to provide a function of, after making the user grasp an actual configuration, changing a combination sequence of the basic configurations, deleting and reproducing the basic configuration, or changing a shape and an attribute thereof.

To accomplish the above objects, according to one aspect of the present invention, there is provided a solid editing method in a three-dimensional CAD system, having a display screen and an operation unit for operating basic configurations displayed on the display screen, for completing a final three-dimensional configuration by an operation of combining a plurality of basic configurations. The solid editing method comprises a step of displaying, on the display screen, in-the-making configurations from a first basic configuration as a start configuration down to the final three-dimensional configuration, a selecting step of selecting one of the in-the-making configurations displayed, and a step of setting as an edit target the basic configuration finally combined with respect to the selected in-the-making configuration.

The basic configuration connoted herein is a fundamental configuration for forming the three-dimensional configuration. These basic configurations are combined in a specified sequence, thereby generating the three-dimensional configuration.

The in-the-making configuration is a three-dimensional configuration at a stage of its being in the making till the final three-dimensional configuration is completed by sequentially combining the basic configurations.

According to the present invention, the user is made to pick up such an in-the-making configuration, and the basic configuration combined last in the selected in-the-making configuration, is set as an edit target.

According to another aspect of the present invention, a readable-by-computer recording medium may be recorded with a program for indicating a computer to edit a three-dimensional configuration formed by sequentially combining basic configurations. This program comprises a step of displaying, on the display screen, in-the-making configurations from a first basic configuration as a start configuration down to the final three-dimensional configuration, a selecting step of selecting one of the in-the-making configurations displayed, and a step of setting as an edit target the basic configuration finally combined with respect to the selected in-the-making configuration.

This program may further comprise a step of generating a sum (disjunction) of the basic configurations, a difference between the basic configurations, and a product (conjunction) of the basic configurations.

In this program, the selecting step may further involve a step of selecting a first in-the-making configuration and a second in-the-making configuration, and the program further comprises a sequence changing step changing a combination sequence of the basic configuration set as an edit target with the selection of the first in-the-making configuration, to just posterior (or just anterior) to the second in-the-making configuration.

The three-dimensional configuration may be stored in the form of element data representing the basic configuration, and sequence indicating data representing a combination sequence of plural items of element data, and the sequence changing step may involve changing the sequence indicating data.

This program may further comprise a step of deleting the edit target basic configuration from the combination of the basic configuration forming the final three-dimensional configuration.

This program may further comprise a step of setting the edit target basic configuration in a non-display state (or a display state from the non-display state) with respect to the combination of the basic configurations for forming the final three-dimensional configuration.

In this program, the selecting step may involve a step of selecting the first in-the-making configuration and the second in-the-making configuration, and the program may further comprises a step of reproducing the basic configuration set as the edit target due to the first in-the-making configuration, to the second in-the-making configuration.

This program may further comprise a step of changing the edit target configuration or changing attributes thereof.

According to a further aspect of the present invention, a readable-by-computer recording medium may be recorded with a program for indicating a computer to edit a three-dimensional configuration formed by sequentially combining basic configurations. This program comprises a step of displaying in-the-making configurations from a first basic configuration as a start configuration down to the final three-dimensional configuration, a selecting step of selecting the basic configuration visible in the in-the-making configuration displayed, and a step of setting the selected basic configuration as an edit target.

As explained above, according to the present invention, in the three-dimensional CAD system for forming the final three-dimensional configuration by sequentially combining the basic configurations, the in-the-making configurations down to the final three-dimensional configuration are displayed, and the basic configuration as an edit target is specified by selecting one of these in-the-making configurations. Hence, according to the present invention, it is possible to make the user grasp and specify even the basic configuration invisible in the finally generated three-dimensional configuration.

Moreover, in the three-dimensional CAD system, after making the user actual configuration, it is feasible to change the combination sequence of the basic configurations for forming the three-dimensional configuration, delete and reproducce the basic configuration, or change its shape and attribute.

BRIEF DESCRIPTION OF THE DRAWINGS

FIG. 4 is a chart showing a data structure for expressing the three-dimensional configuration;

DETAILED DESCRIPTION OF THE PREFERRED EMBODIMENT

Embodiment

An embodiment of the present invention will hereinafter be described with reference to FIGS. 1 through 16.

Figure 1:
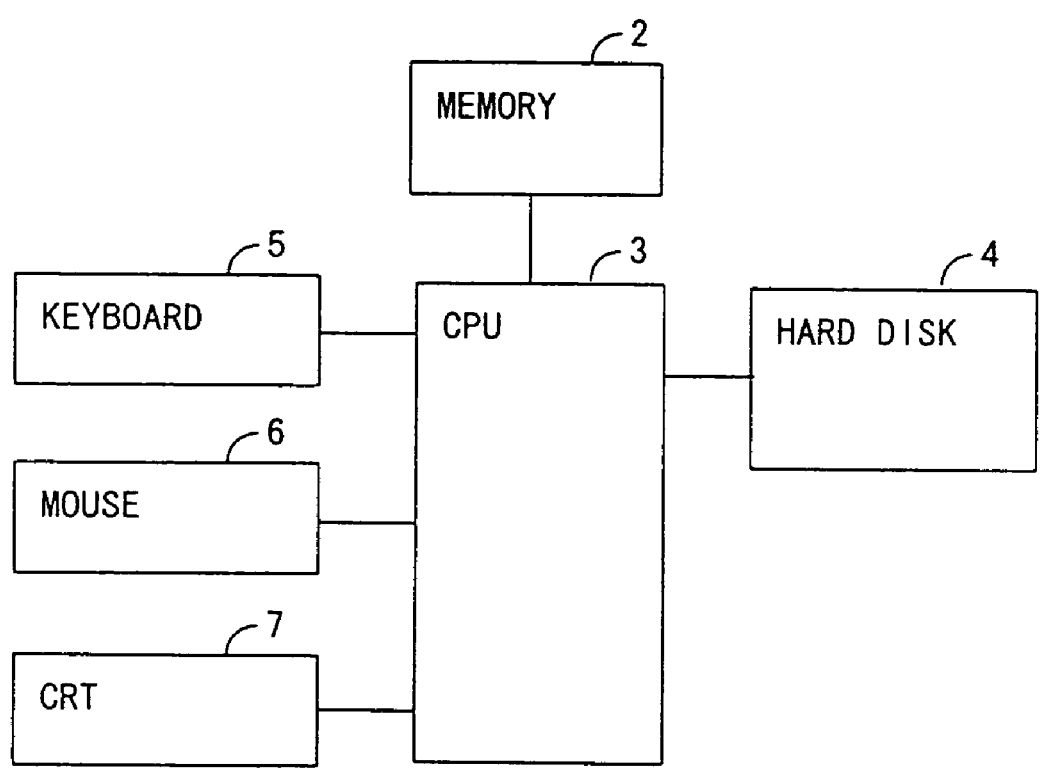
FIG. 1 is a diagram showing a hardware architecture of a CAD system in an embodiment of the present invention.
Figure 2:
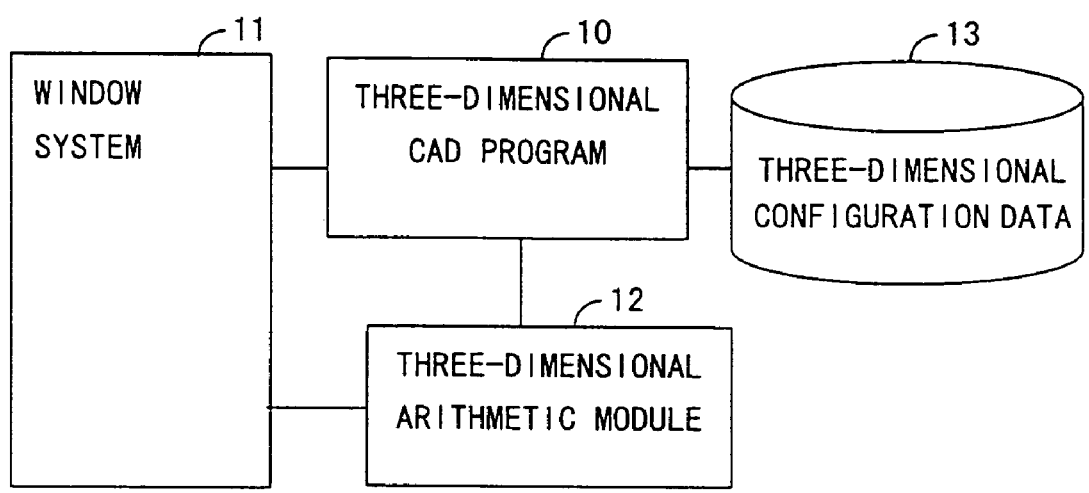
FIG. 2 is a diagram showing a program-based architecture in the CAD system in the embodiment of the present invention.
Figure 3:
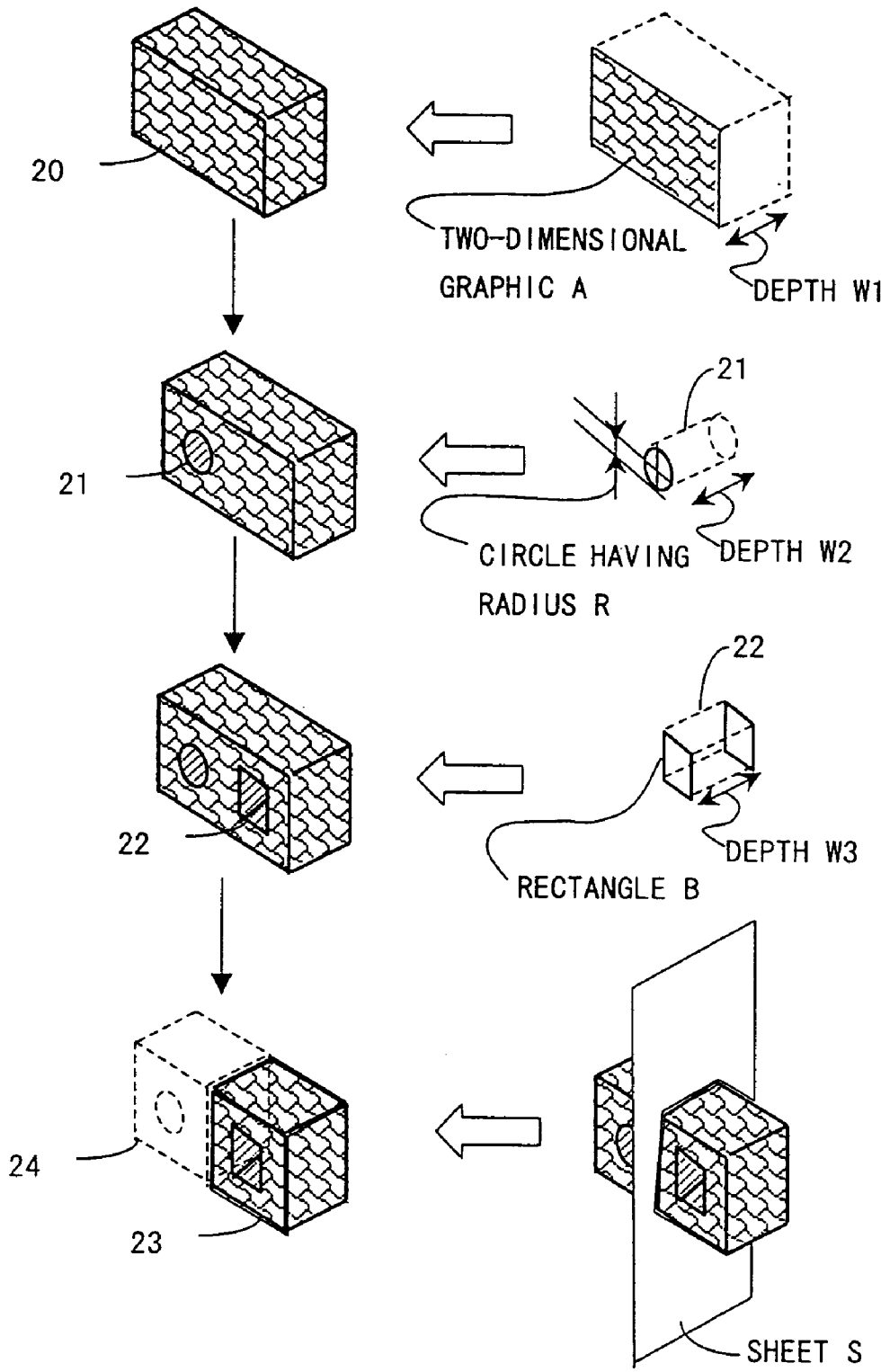
FIG. 3 is a view showing an example 1 of forming a three-dimensional configuration by combining the basic configurations.
Figure 5:
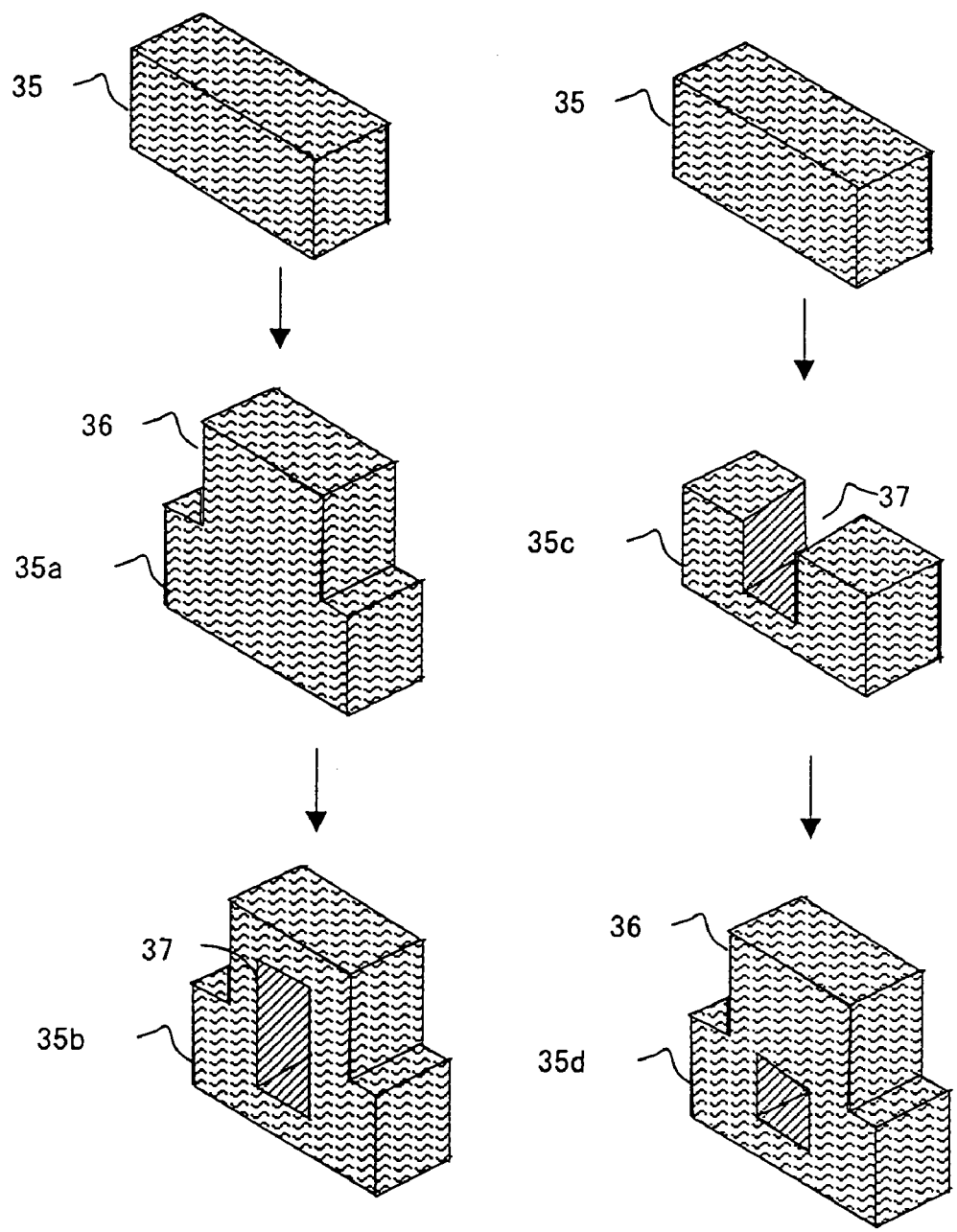
FIG. 5 is a view showing an example 2 of forming the three-dimensional configuration by combining the basic configurations.
Figure 14:
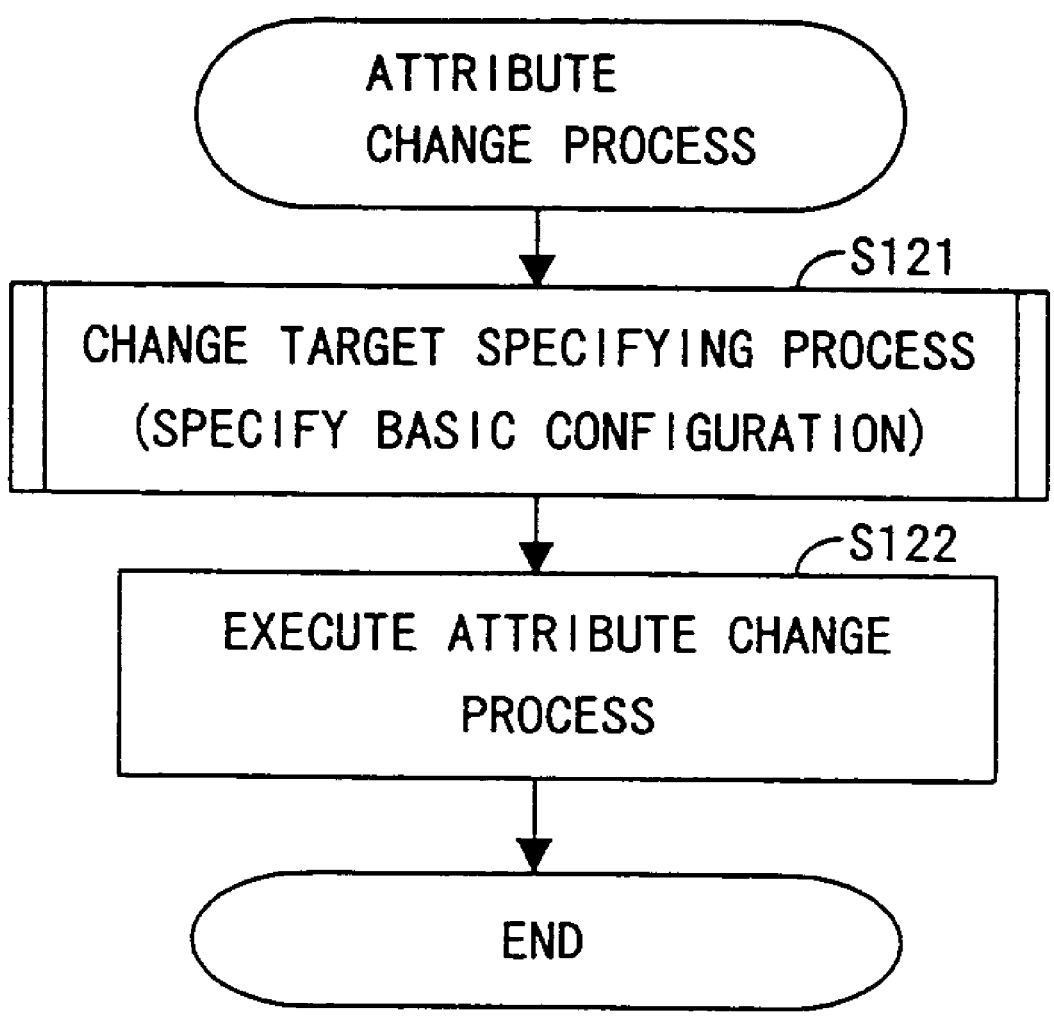
FIG. 14 is a flowchart showing an attribute change process.
Figure 15:
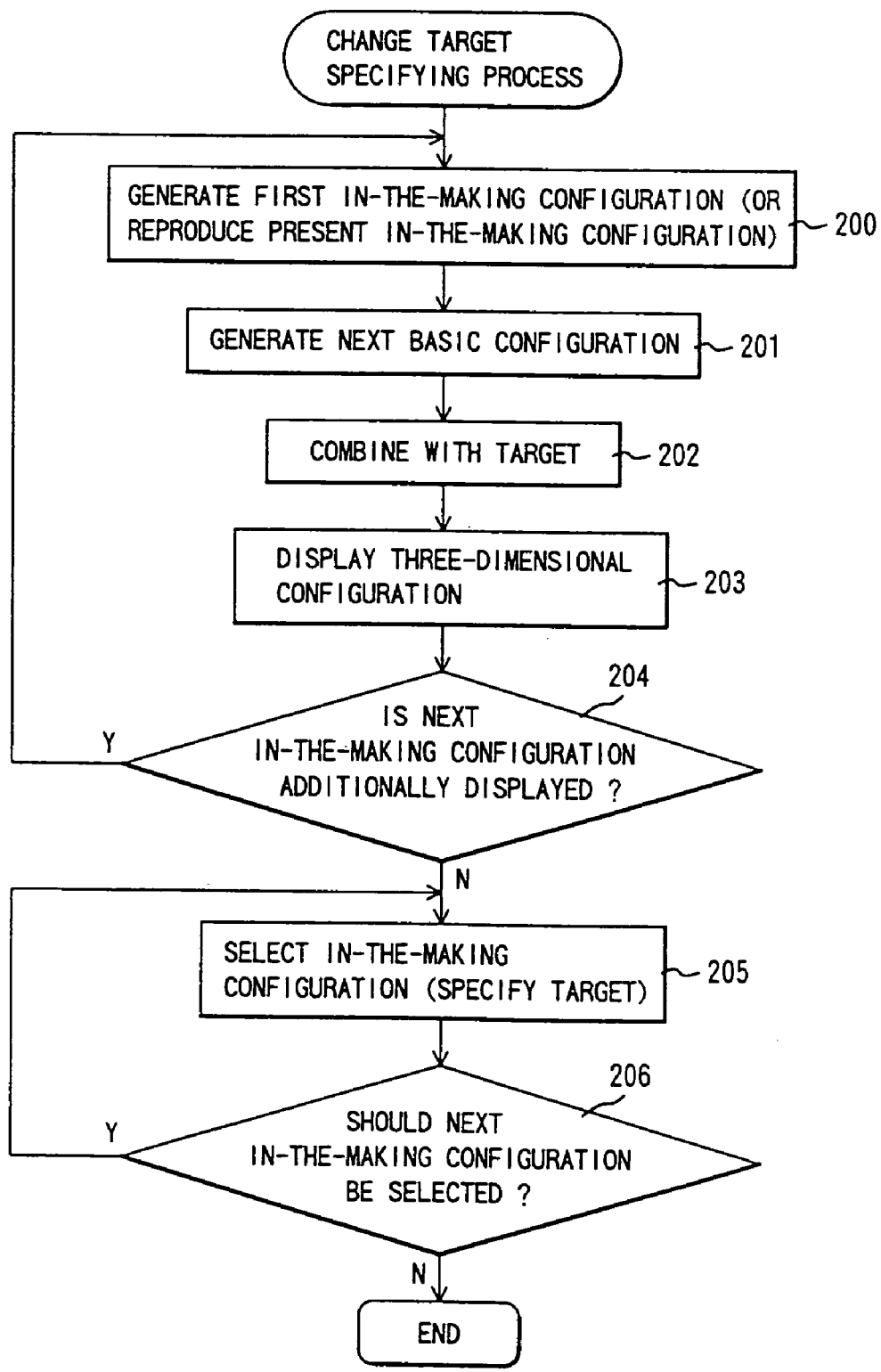
FIG. 15 is a flowchart showing a change target specifying process.
Figure 16:
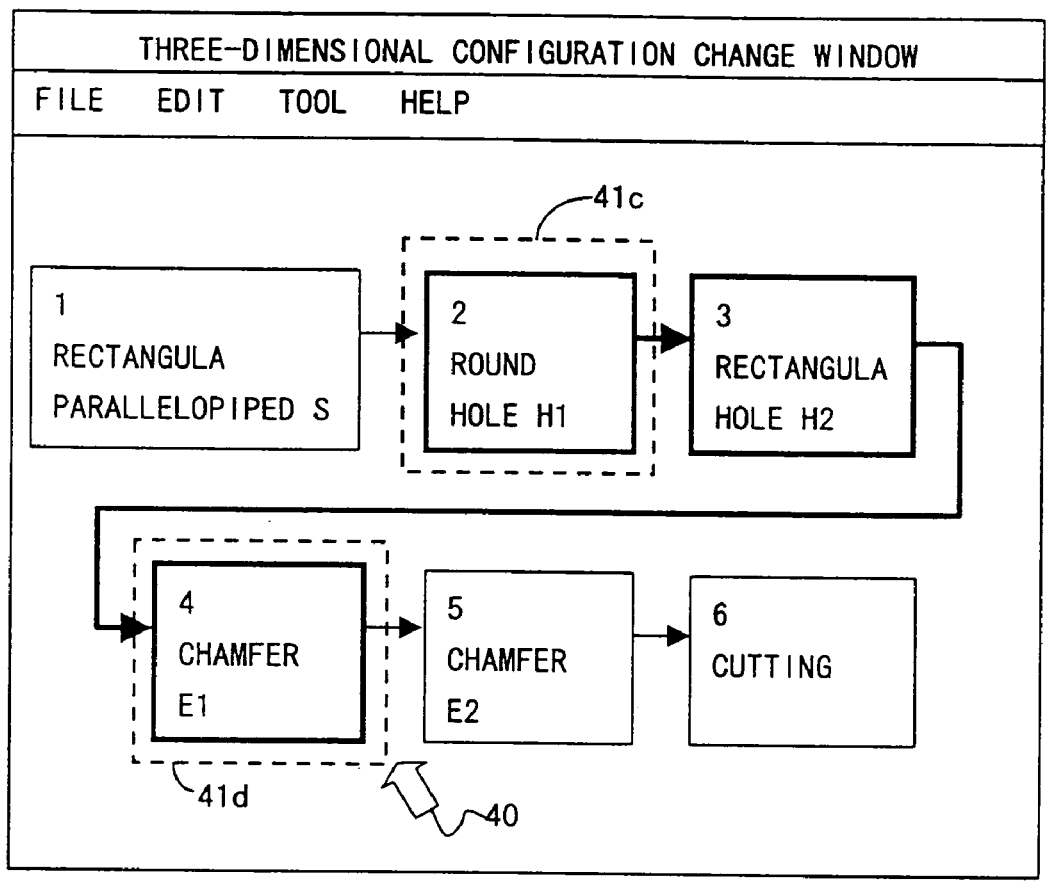
FIG. 16 is a view showing an example of specifying a display range based on a feature tree.

FIG. 1 is a diagram showing a hardware architecture of a CAD system in this embodiment. FIG. 2 is a diagram showing an architecture based on a program executed by a CPU 3 of the CAD system shown in FIG. 1. FIG. 3 shows one example in which a three-dimensional configuration is formed by combining basic configurations. FIG. 4 is a chart showing a dada structure for expressing the three-dimensional configuration illustrated in FIG. 3. FIG. 5 shows a second example in which the three-dimensional configuration is formed by combining the basic configurations. FIGS. 6 through 15 are flowcharts each showing processes of a three-dimensional CAD system program shown in FIG. 2. FIG. 16 shows an example of an operation with respect to a feature tree for expressing a sequence of combining the basic configurations.

<Architecture>

FIG. 1 illustrates the hardware architecture of the CAD system in this embodiment. As shown in FIG. 1, this CAD system includes a memory 2 for storing a program and data, a CPU 3 for executing the program stored in the memory 2, a hard disk 4 for recording the program and the data, a keyboard 5 for a user to input character data, etc. to the CPU 3, a mouse 6 for the user to point graphic forms, etc. to the CPU, and a CRT 7 for displaying configuration data, etc. recorded on the hard disk 4.

The memory 2 is stored with the program and the data.

The CPU 3 executes the program stored in the memory 2, thereby providing a function of the three-dimensional CAD system. To be more specific, the CPU 3 generates three-dimensional CAD data and stores the hard disk 4 with the same CAD data in accordance with an indication from the user. Further, the CPU 3 reads the data stored in the hard disk 4 and displays a three-dimensional configuration of the data on the CRT 7.

The hard disk 4 is stored with the program and the data (which corresponds to a readable-by-computer recording medium).

The user of this CAD system inputs character data, etc. to the CPU 3 by use of the keyboard 5. Further, the user indicates the graphic forms, etc, to the CPU by using the mouse 6. The keyboard 5 and the mouse 6 correspond to an operation unit.

FIG. 2 is the diagram showing the program-based architecture of the CAD system. This CAD system includes a window system 11 serving as a user interface, a three-dimensional CAD program 10 that receives the indication of the user from the window system 11 and generates three-dimensional configuration data 13, and a three-dimensional configuration arithmetic module 12 for executing an arithmetic operation with respect to the three-dimensional configuration data 13 and displaying an arithmetic result on the CRT 7 in response to a command given from the three-dimensional CAD program 10.

The three-dimensional CAD program 10 receives the user's indication via the window system 11, and generates the three-dimensional configuration data 13 in accordance with this indication. Further, the three-dimensional CAD program 10 stores the hard disk 4 with the thus generated three-dimensional configuration data 13. Moreover, the three-dimensional CAD program 10 transfer the generated three-dimensional configuration data 13 to the three-dimensional configuration arithmetic module 12, which in turn executes the arithmetic operation with respect to the three-dimensional configuration data 13.

The window system 11 detects the user operates the keyboard 5 and the mouse 6, and transfers the user's operation to the three-dimensional CAD program 10. Further, the window system 11 displays the arithmetic result of the three-dimensional configuration arithmetic module 12 on the CRT 7.

The three-dimensional configuration arithmetic module 12 executes the arithmetic operation with respect to the three-dimensional configuration data 13 in response to the command given from the three-dimensional CAD program 10. In this arithmetic operation, the basic configurations are combined in a combination sequence determined for every set of the three-dimensional configuration data 13. A three-dimensional configuration is generated by combining these basic configurations.

Logic operation functions (AND, OR, SUBTRACT, etc.) may be specified in this process of combining the basic configurations (which corresponds to a step of generating a sum of the basic configurations, a difference therebetween or a product thereof). For example, a basic configuration 1 and a basic configuration 2 are ANDed (processed with AND operation) thereby generating a common portion of these two basic configurations. Moreover, the basic configuration 1 is Ored (processed with OR operation) with the basic configuration 2, thereby generating an added configuration of these two basic configuration. Further, the basic configuration 2 is SUBTRACTed from the basic configuration 1, thereby generating a configuration into which the basic configuration 2 is excluded from the basic configuration 1. If the logic operation is not designated, however, OR (corresponding to an addition) is executed as a default operation.

The generated three-dimensional configuration is displayed on the CRT 7 via the window system 11.

<Generation process of Three-Dimensional Configuration>

FIG. 3 shows one example of a process of generating the three-dimensional configuration by the present CAD system. In this CAD system, the three-dimensional configuration is generated by sequentially combining the basic configurations as shown in FIG. 3 (by executing the logic operation between the basic configurations in a predetermined combination sequence).

Referring to FIG. 3, at first a two-dimensional graphic sweep configuration 20 (hereinafter simply referred to as a sweep 20) is generated. The sweep 20 may be defined as a configuration corresponding to a locus depicted when a two-dimensional graphic A (shown as a rectangle in FIG. 3) moves by a depth W1.

Next, a sweep hole 21 taking a circular shape in section is added to the sweep 20. The sweep hole 21 is a hole shape corresponding to a locus depicted when a circle having a radius R moves by a depth W2.

Subsequently, a sweep hole 22 taking a rectangular shape in section is added to the sweep 20. The sweep hole 22 is a hole shape corresponding to a locus drawn when a rectangle B moves by a depth W3.

Next, the sweep 20 is sheet-cut by a sheet S. A left portion 24 from the sheet S is thereby cut off, and a right portion 23 from the sheet S is left. The right portion 23 from the sheet S is an eventually formed three-dimensional configuration.

FIG. 4 shows the data structure for expressing the three-dimensional configuration created in the procedures in FIG. 3. This data structure is formed by linking configuration elements (corresponding to element data) each taking a predetermined structure with pointers (corresponding to sequence indicating data) (this data structure may be termed a list structure).

This list structure starts with a head element 30. The head element 30 has a name of the three-dimensional configuration and a pointer to the next configuration element. The name of the three-dimensional configuration is a name of a configuration expressed by a whole list structure indicated by the head element 30.

Further, a basic configuration element 31 is pointed by the pointer to the next configuration element within the head element 30. The basic configuration element 31 is stored with data for expressing one single basic configuration. This basic configuration element 31 includes fields such as "Pointer to Next Element", "Name", "Category", "Two-Dimensional Graphic", "Depth", "Application Method" and "Comment".

A next basic configuration element 31 is pointed by the pointer to the next element. If the pointer is NULL, this implies that the very basic configuration element 31 is a tail of the list structure.

The name in the basic configuration element 31 is a name of this basic configuration. This name is given by the user.

Figure 17:
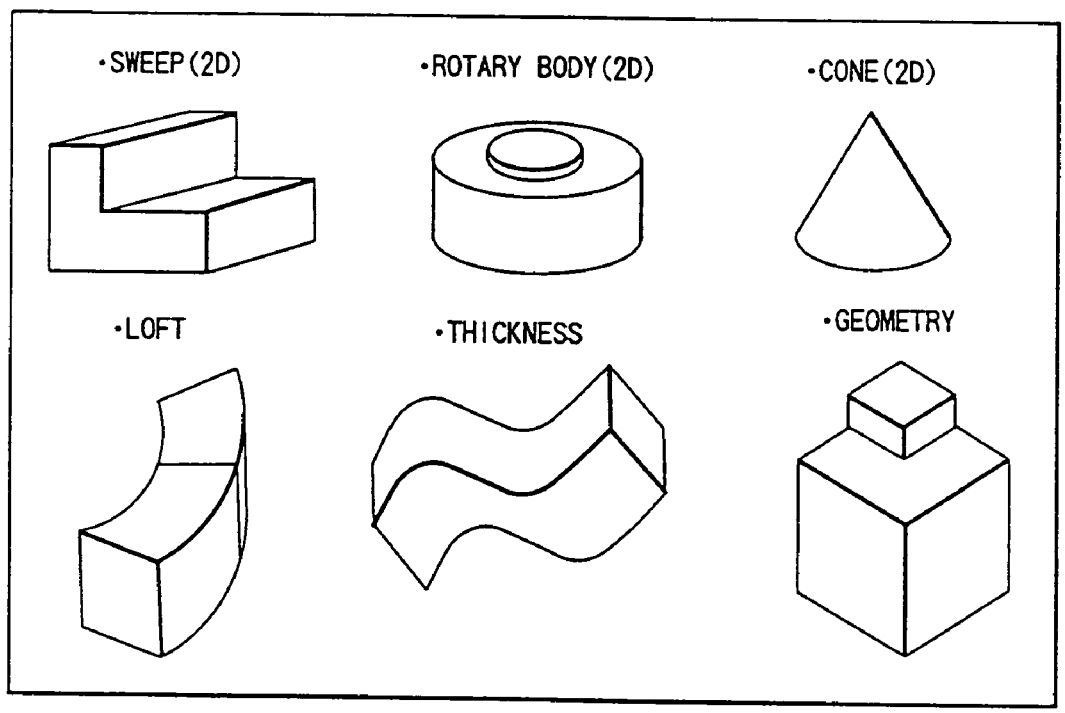
FIG. 17 is a view showing an example 1 of the basic configurations.
Figure 18:
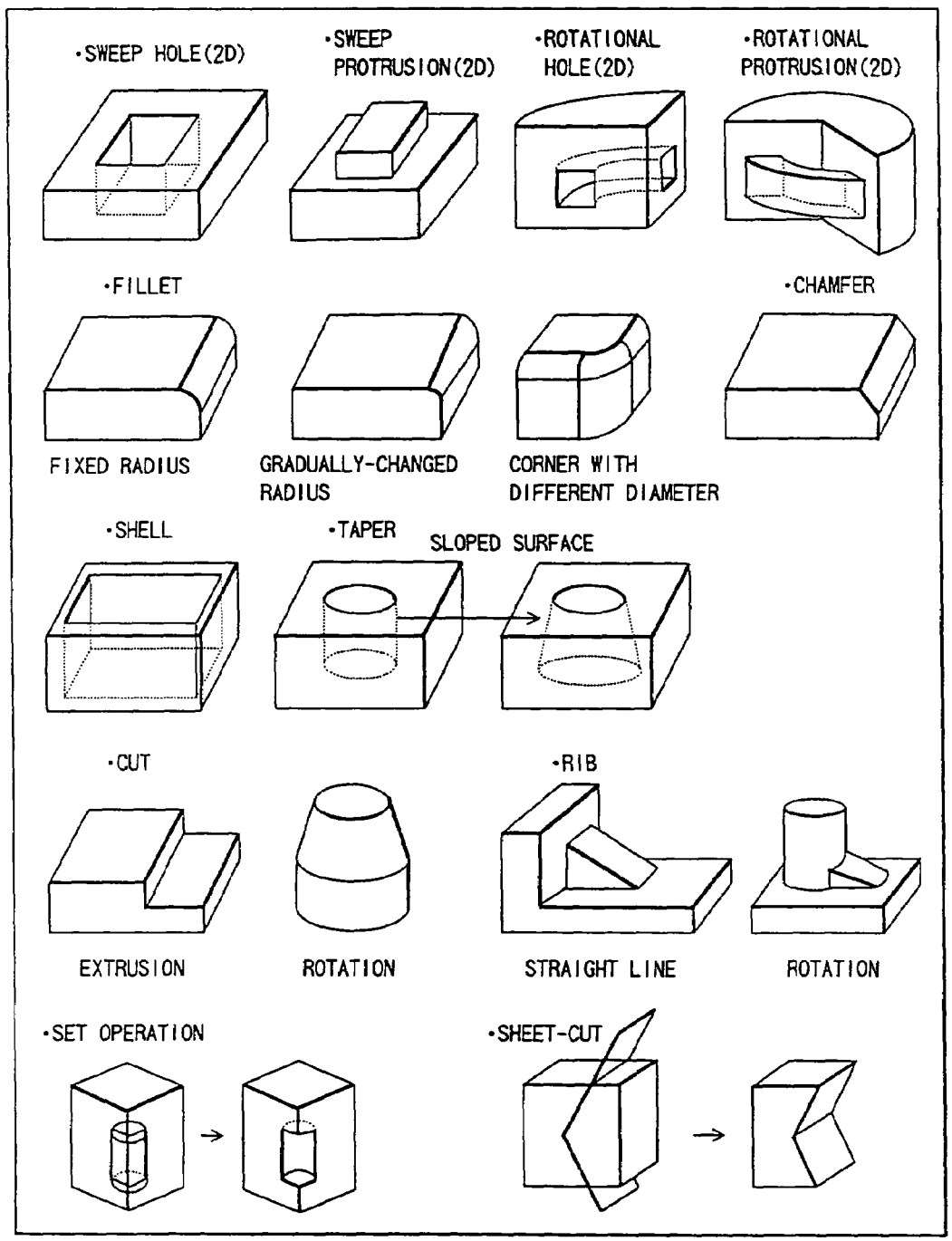
FIG. 18 is a view showing an example 2 of the basic configurations.

The category in the basic configuration element 31 is a category of this basic configuration. The categories of the basic configurations are, for instance, a two-dimensional graphic sweep configuration (simply referred to as a sweep) a sweep hole, a sheet-cut, etc. (see FIGS. 17 and 18).

The two-dimensional graphic in the basic configuration element 31 is a graphic as a basis for shaping the three-dimensional configuration. This two-dimensional graphic is a sectional shape in, e.g., the two-dimensional sweep configuration and the sweep hole.

Further, in the sheet-cut, the two-dimensional configuration is coordinates indicating a position for cutting. The coordinates thereof are not, however, three-dimensional coordinates but two-dimensional coordinates within the section perpendicular to the sheet taking the three-dimensional configuration.

The depth in the basic configuration element 31 shows a moving quantity when sweeping. This depth is given to the sweep graphics such as the two-dimensional graphic sweep configuration, the weep hole, etc.

The comment in the basic configuration element 31 is a character string arbitrarily given by the user.

FIG. 5 shows a second example of the process of generating the three-dimensional configuration in the present CAD system. In the left line in FIG. 5, a first basic configuration (a sweep 35) is provided with a sweep 36, thereby generating an in-the-making configuration 35a. Further, the in-the-making configuration 35a is provided with a sweep hole 37, thereby generating a final three-dimensional configuration 35b.

On the other hand, in the right line in FIG. 5, the first basic configuration (the sweep 35) is provided with the sweep 37, thereby generating an in-the-making configuration 35c. Further, the in-the-making configuration 35c is provided with the sweep 36, thereby generating a final three-dimensional configuration 35d.

Thus, the three-dimensional configuration finally generated differs depending on the sequence of combining the basic configurations. Moreover, as shown in FIG. 3, all the basic configurations used are not necessarily visible in the finally obtained three-dimensional configuration as the case may be.

In the CAD system in this embodiment, the user is provided with a function to grasp the basic configurations combined for forming the three-dimensional configuration, including the basic configurations which are invisible at the final stage. Then, the user is thereby able to change the sequence of combining the basic configurations, to delete, reproducing and change the respective basic configurations, and to change attributes thereof.

<Operation Screen>

Figure 6:
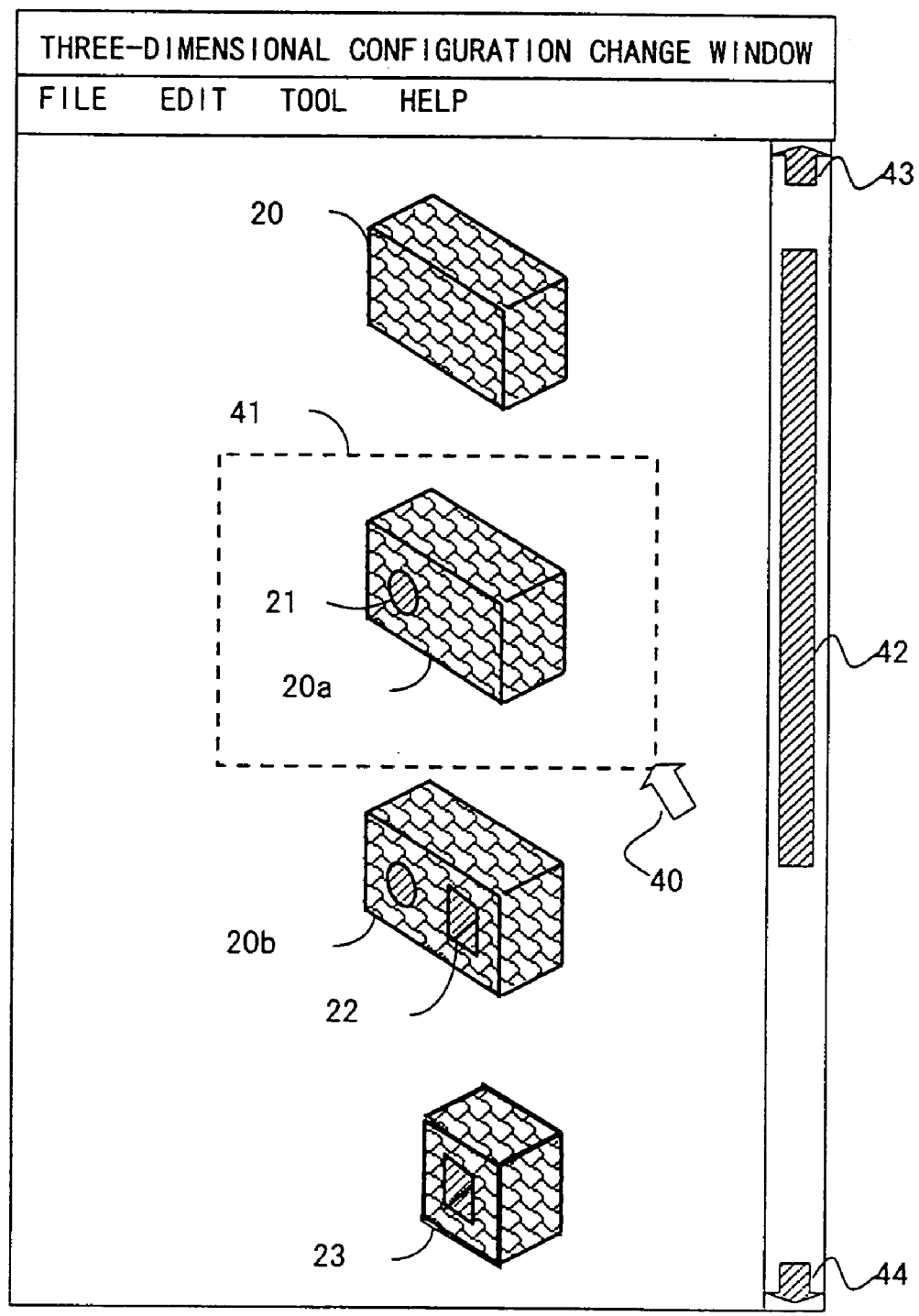
FIG. 6 is a view showing an example 1 of an operation screen.

FIG. 6 illustrates an operation screen displayed on the CRT 7 of the present CAD system. To start with, the user specifies a name of the three-dimensional configuration (a name held in the head element 30 in FIG. 4) that the user has a scheme to change. Then, in-the-making configurations in the process of forming this three-dimensional configuration are displayed on the operation screen (a three-dimensional configuration change window) in FIG. 6. These in-the-making configurations are displayed based on the sequence of combining the basic configurations for forming the three-dimensional configuration (which corresponds to a step of displaying the in-the-making configuration on the display screen).

Referring to FIG. 6, an in-the-making configuration 20a is formed by adding a sweep hole 21 to the first basic configuration 20. A sweep hole 22 is added to the in-the-making configuration 20a, thereby generating an in-the-making configuration 20b. The in-the-making configuration 20b is sheet-cut, thereby generating a final three-dimensional configuration 23.

There are a great number of basic configurations for forming a designated three-dimensional configuration, and all the in-the-making configurations might not be displayed depending on the screen in FIG. 6 in some cases. In such a case, the screen may be scrolled by a scroll bar 42 or scroll buttons 43, 44 for scrolling in up-and-down directions. The user is able to select any one of those in-the-making configurations by framing it with a rectangle cursor 41 by use of a mouse pointer 40.

Referring again to FIG. 6, the in-the-making configuration 20a is picked up by this selection (corresponding to a selecting step). In the present CAD system, with the selection of this in-the-making configuration, the basic configuration (the sweep hole 21 in FIG. 6) finally combined for forming the same in-the-making configuration is specified (which corresponds to a step setting the finally combined basic configuration as an edit target). This basic configuration becomes a target for the sequence change, the deletion, the reproducing, the configuration change, the attribute change, etc.

Now, it is presumed that, for example, the sweep hole 21 invisible in the finally generated three-dimensional configuration 23 is to be changed. In this case, the user displays the in-the-making configuration on the present operation screen. Then, the user specifies the sweep hole 21 by choosing the corresponding in-the-making configuration 20a.

Figure 7:
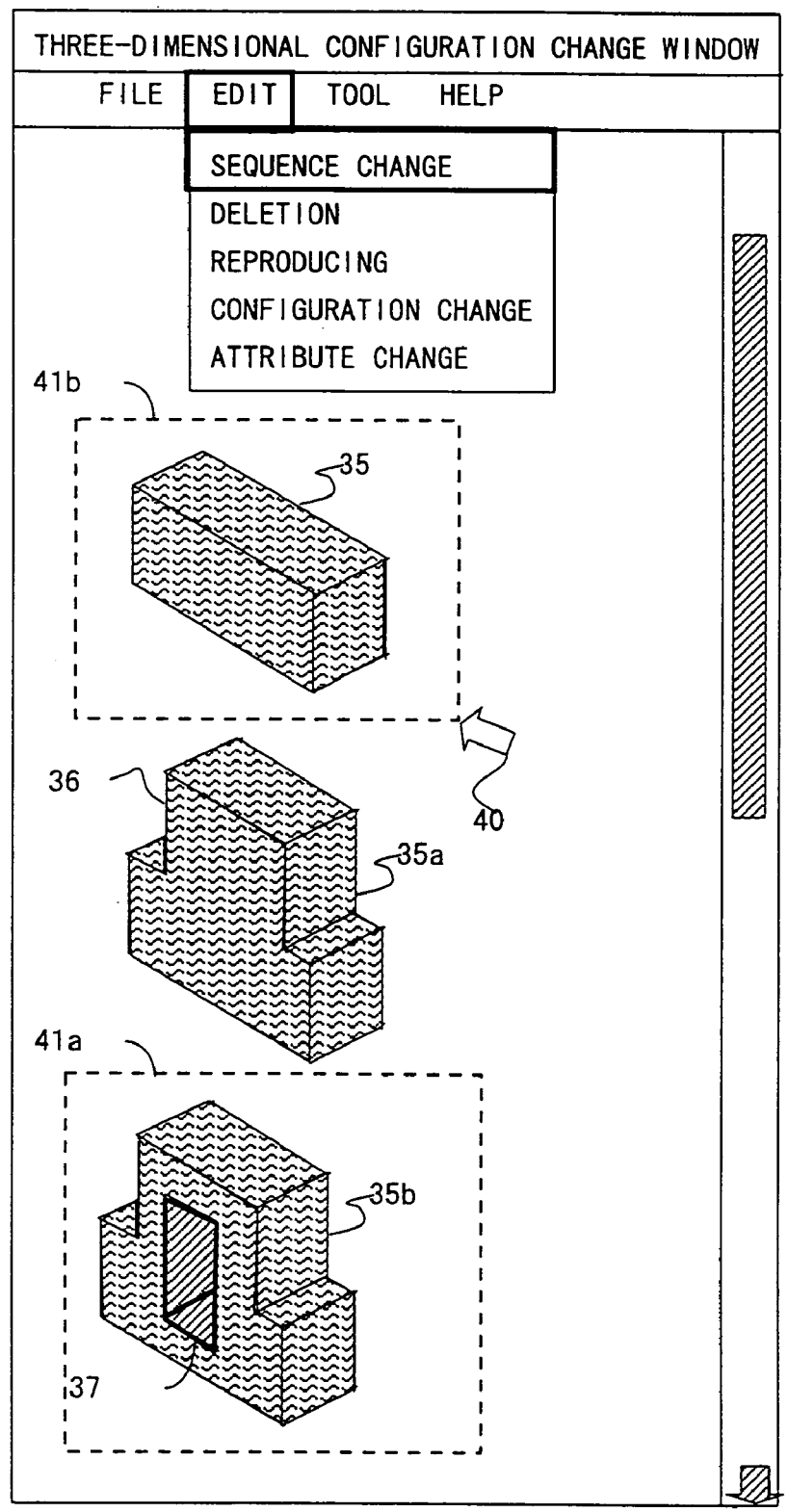
FIG. 7 is a view showing an example 2 of the operation screen.

FIG. 7 shows an example of the operation of changing the sequence change of the basic configurations.

The user, to begin with, selects the sequence change from an edit menu by use of the mouse pointer 40.

Next, the user selects an in-the-making configuration 35b with a rectangle cursor 41a by operating the mouse pointer 40 (the in-the-making configuration 35b may be defined as a final three-dimensional configuration in this example). As a result, there is specified the basic configuration (the sweep hole 37) finally combined for generating the in-the-making configuration 35b. As shown in FIG. 7, in the present CAD system, the specified basic configuration (the sweep hole 37 in FIG. 7) is displayed emphatically with a bold line.

Subsequently, the user pinpoints where the specified basic configuration moves to. A position to which the specified basic configuration moves is specified by selecting the in-the-making configuration (the sweep 35) as a moving destination with a rectangle cursor 41b by manipulating the mouse pointer 40. In this case, the graphic finally combined with the in-the-making configuration is the sweep 35 itself.

With the operations described above, the basic configuration (the sweep hole 37) is combined, instead of the in-the-making configuration 35a, with the first basic configuration (the sweep 35). As a consequence, the three-dimensional configuration 35b shown in the left line in FIG. 5 becomes as the three-dimensional configuration 35d shown in the right line is.

The processing of the three-dimensional CAD program 10 shown in FIG. 2 will be described in conjunction with the drawings in FIGS. 8 through 15. The CPU 3 provides the functions described above by executing the three-dimensional CAD program 10.

<Outline of Three-Dimensional Configuration Change Process>

Figure 8:
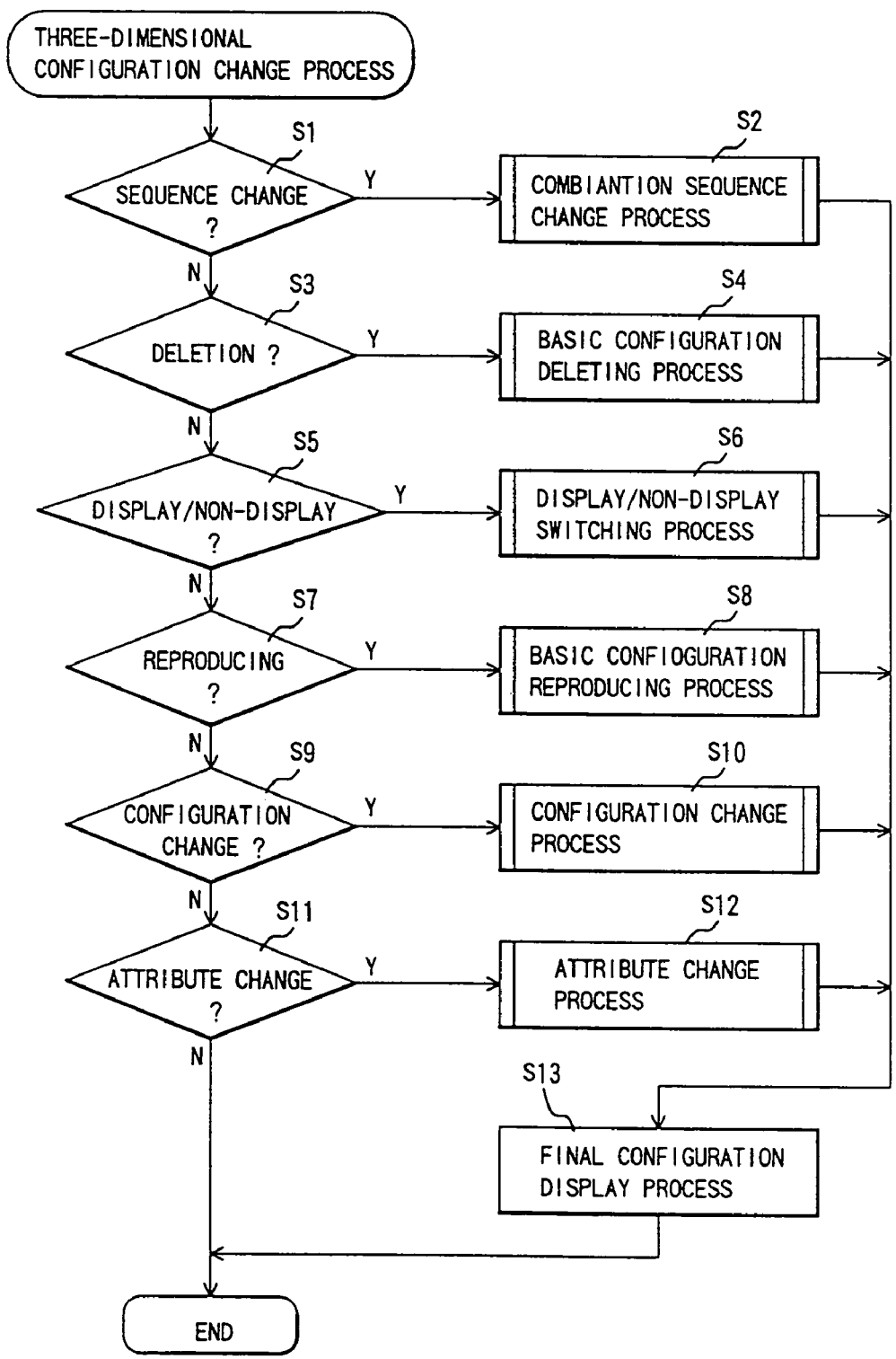
FIG. 8 is a flowchart showing a three-dimensional configuration change process.

FIG. 8 shows a whole of a three-dimensional graphic change process (corresponding to a solid editing) of the three-dimensional CAD program 10. The CPU 3, when the edit menu shown in FIG. 7 is selected, executes the process in FIG. 8.

To begin with, the CPU 3 judges whether or not the indication is the sequence change (step S1, which will hereinafter be abbreviated to S1). If judged to be sequence change (Yes judgement in S1), the CPU 3 executes a combination sequence change process (S2).

Whereas if not (No judgement in S1), the CPU 3 judges whether or not it is the deletion (S3). If judged to be deletion (Y in S3), the CPU 3 executes a basic graphic deleting process (S4).

Whereas if not (N in S3), the CPU 3 judges whether or not display/non-display is carried out (S5). If judged to be the display/non-display (Y in S5), the CPU 3 executes a display/non-display switching process (S6).

Whereas if not (N in S5), the CPU judges whether or not it is the reproducing (S7). If judged to be the reproducing (Y in S7), the CPU executes a basic configuration reproducing process (S8).

Whereas if not the reproducing (N in S7), the CPU 3 judges whether or not the indication is the configuration change (S9). If judged to be the configuration change (Y in S9), the CPU 3 executes a configuration change process.

Whereas if not the configuration change (N in S9), the CPU 3 judges whether or not it is the attribute change (S11). If judged to be the attribute change (Yin S11), the CPU 3 executes the attribute change process (S12).

If not the attribute change (N in S11), in the present system, the CPU 3 executes nothing and finishes the three-dimensional configuration change process.

Further, after the combination sequence change process, the basic configuration deletion process, the display/non-display switching process, the basic configuration reproducing process, the configuration change process and the attribute change process, the CPU 3 executes a final configuration display process (S13). As a result, the finally generated three-dimensional configuration is displayed on the CRT 7. Thereafter, the CPU 3 finishes the three-dimensional configuration change process.

<Combination Sequence Change Process>

Figure 9:
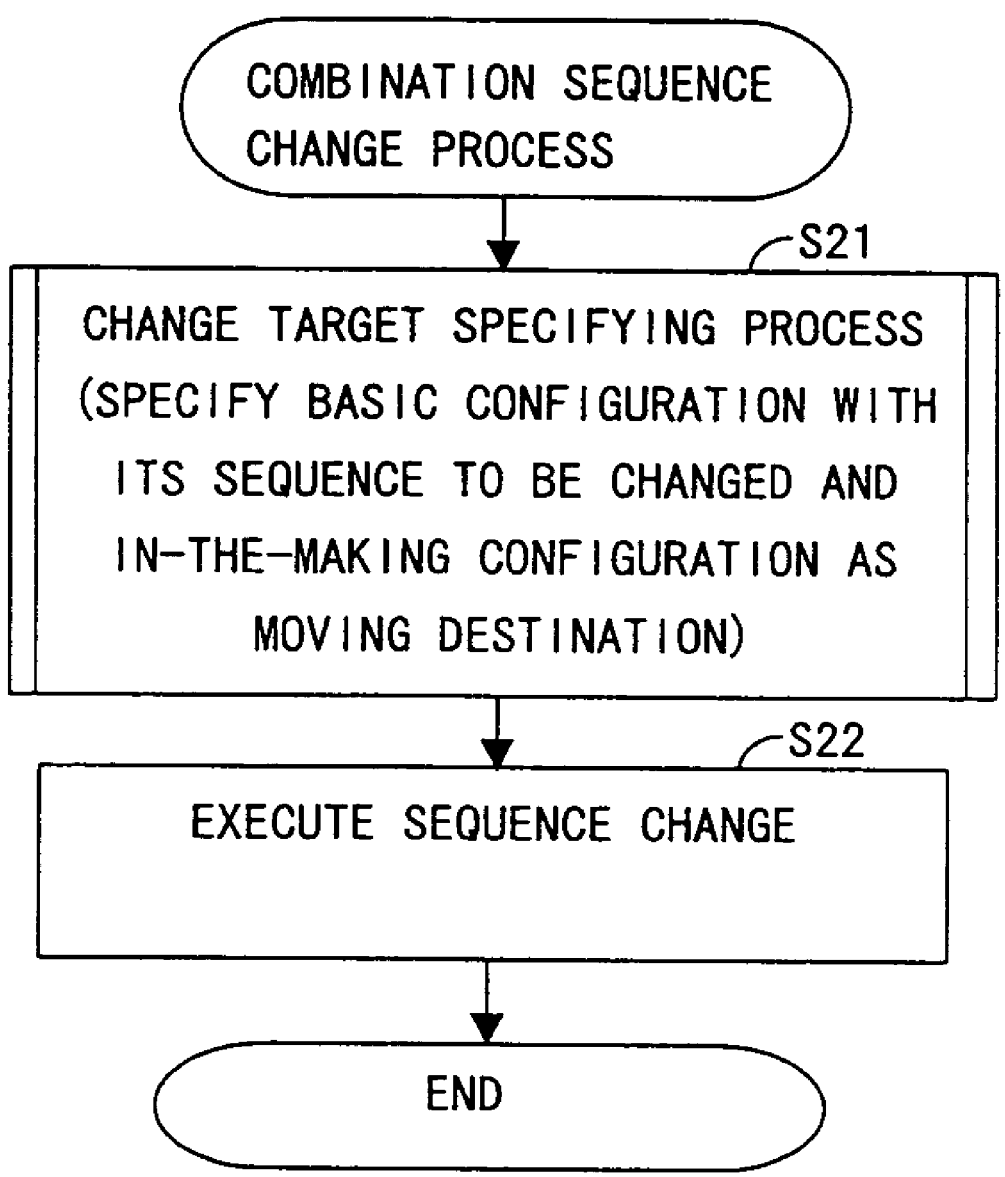
FIG. 9 is a flowchart showing a combination sequence change process.

FIG. 9 is a flowchart showing the combination sequence change process. The combination sequence change process is, as exemplified in FIG. 7, a process of changing the sequence of combining the basic configurations for shaping the three-dimensional configuration.

At first, the CPU 3 executes a change target specifying process (S21). In the change target specifying process, the CPU 3 displays a plurality of in-the-making configurations by sequentially combining the basic configurations for forming the three-dimensional configuration. In this case, in the change target specifying process started from the combination sequence change process, the CPU 3 operates so that the user chooses two pieces of in-the-making configurations among those displayed.

First, this intends to specify the basic configuration for changing the combination sequence. Namely, the basic configuration finally combined for generating the in-the-making configuration is specified as a change target basic configuration.

Second, that intends to specify where the above specified basic configuration moves to. That is, the moving destination is the in-the-making configuration selected second.

Next, the CPU 3 transfers the above basic configuration to the moving destination described above (S22, which corresponds to a sequence changing step). This process being thus done, in the list structure shown in FIG. 4, a position of the change target basic configuration element 31 shifts. In this shift, the "Pointer to Next Element" in the basic configuration element 31 is changed (a basic configuration element address on the memory 3 is not changed). More specifically, the change target basic configuration element 31 is pointed by the "Pointer to Next Element" included in the moving destination basic configuration element 31. Further, the "Pointer to Next Element" included in the changing target basic configuration element 31 points a next basic configuration element 31 after the movement. The combination sequence (a sequence in terms of the list structure) of the basic configuration element 31 is thereby changed.

Thereafter, the CPU 3 finishes the combination sequence change process.

<Basic Configuration Deleting Process>

Figure 10:
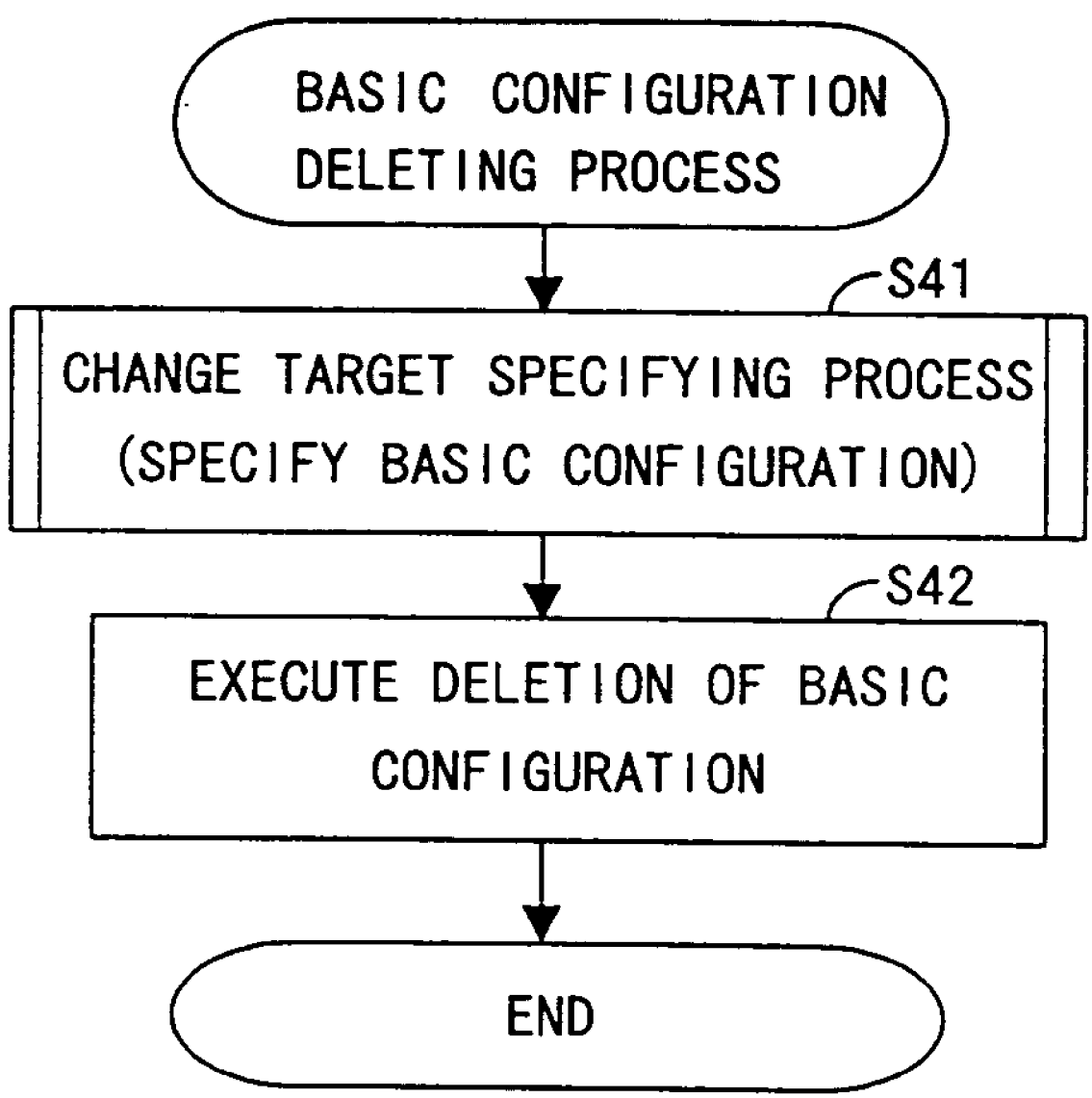
FIG. 10 is a flowchart showing a basic configuration deleting process.

A basic configuration deleting process will be explained referring to a flowchart in FIG. 10. The basic configuration deleting process connoted herein is a process of deleting one of the basic configurations which form the three-dimensional configuration.

To begin with, the CPU 3 executes the change target specifying process (S41). The CPU 3 thereby makes the user specify the basic configuration that should be deleted.

Next, the CPU 3 deletes the specified basic configuration (S42). With this process, the corresponding element is deleted from the list structure illustrated in FIG. 4. In this case, the basic configuration element 31 corresponding to the basic configuration to be deleted, is deleted from the list structure. Further, in the list structure, the "Pointer to Next Element" included in basic configuration element 31 positioned anterior to the deleted basic configuration element 31, points a basic configuration element 31 positioned posterior to the deleted basic configuration element 31.

Thereafter, the CPU 3 finishes the basic configuration deleting process.

<Display/Non-Display Switching Process>

Figure 11:
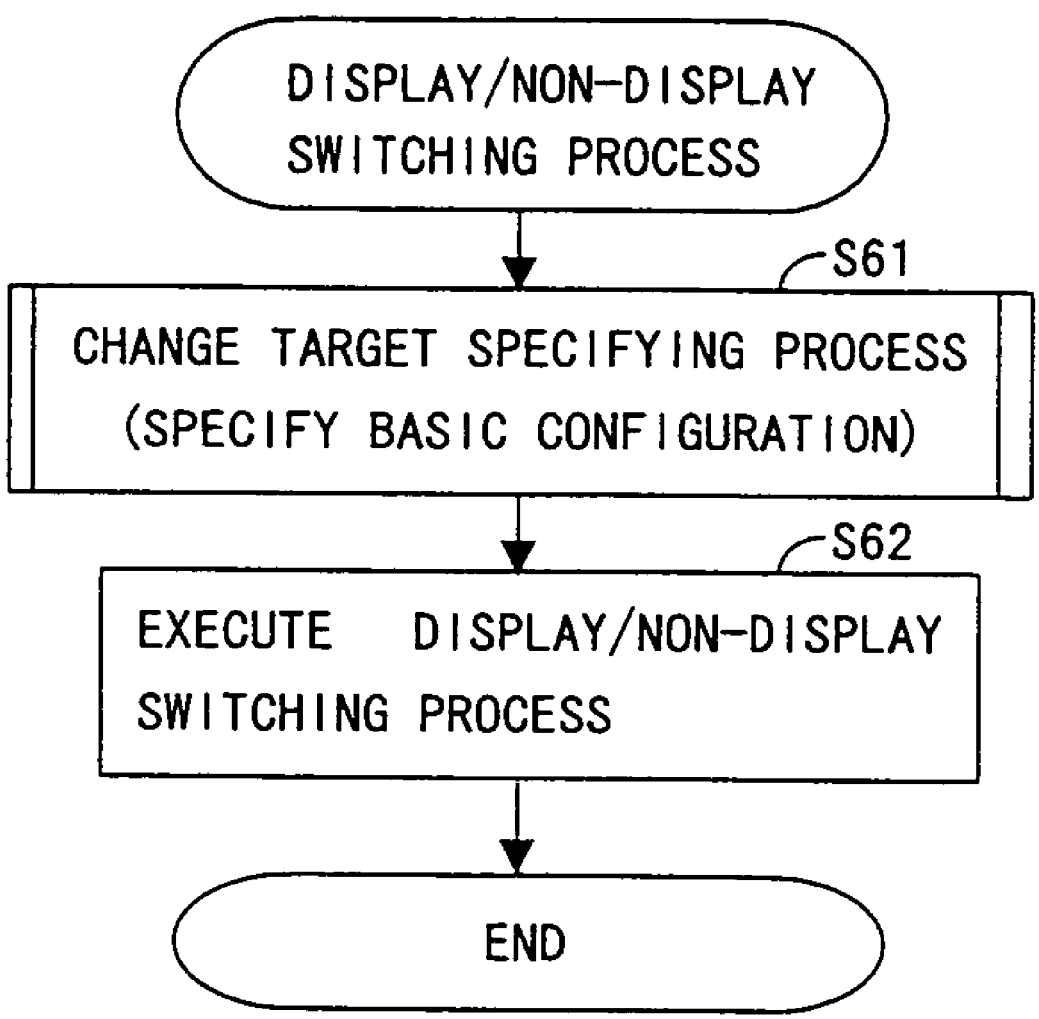
FIG. 11 is a flowchart showing a display/non-display switching process.

A display/non-display switching process will be described with reference to a flowchart in FIG. 11. The display/non-display switching process involves setting one of the basic configurations forming the three-dimensional configuration so that this single basic configuration exists in the list structure shown in FIG. 4 but is invisible in the display of the finally generated three-dimensional. This setting is temporarily retained in the memory 2 but is not retained in the list structure for expressing the three-dimensional configuration.

At first, the CPU 3 executes the change target specifying process (S61). The user is thereby made to specify the basic configuration of which the display and non-display are switched.

Next, the CPU 3 switches the display/non-display state of the specified basic configuration (S62). With this process, the configuration kept in the display state is switched in the non-display state. On the other hand, when the specified basic configuration is in the non-display state, this configuration turns out to be in the display state. Thereafter, the CPU 3 finishes the display/non-display switching process.

<Basic Configuration Reproducing Process>

Figure 12:
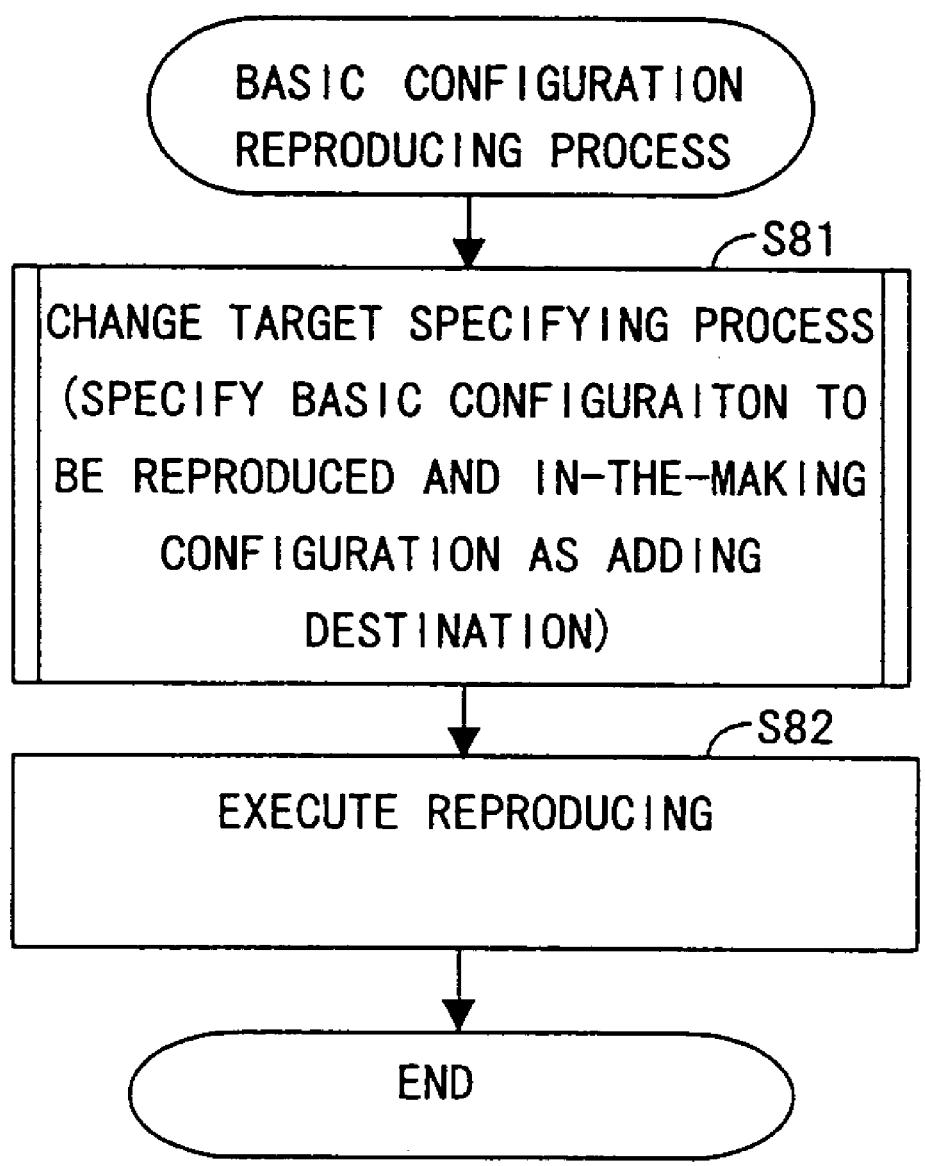
FIG. 12 is a flowchart showing a basic configuration reproducing process.

FIG. 12 is a flowchart showing a basic configuration reproducing process. the basic configuration reproducing process is a process of reproducing one of the basic configurations shaping the three-dimensional configuration, and adding this reproducing to any one of the in-the-making configurations in the process of becoming the finally generated three-dimensional configuration.

At the first onset, the CPU 3 executes the change target specifying process (S81). In the basic configuration reproducing process, the CPU 3, as in the case of the combination sequence change process, makes the user choose two pieces of the in-the-making configurations among those displayed.

First, this intends to specify the basic configuration to be reproduced. Namely, for generating the in-the-making configuration specified first, the basic configuration finally combined is specified as a reproducing target basic configuration.

Second, that intends to specify where the above specified basic configuration reproduced is added to. That is, the in-the-making configuration specified first is reproduced and added to an in-the-making configuration specified second.

Next, the CPU 3 adds the above basic configuration to the reproducing destination described above (S82). With this process, the corresponding element in the list structure shown in FIG. 4 is reproduced to a position corresponding to the specified in-the-making configuration. In this case, a basic configuration element 31 is newly generated in the list structure and added posterior to the basic configuration element 31 corresponding to the reproducing destination.

Thereafter, the CPU 3 finishes the basic configuration reproducing process.

<Configuration Change Process>

Figure 13:
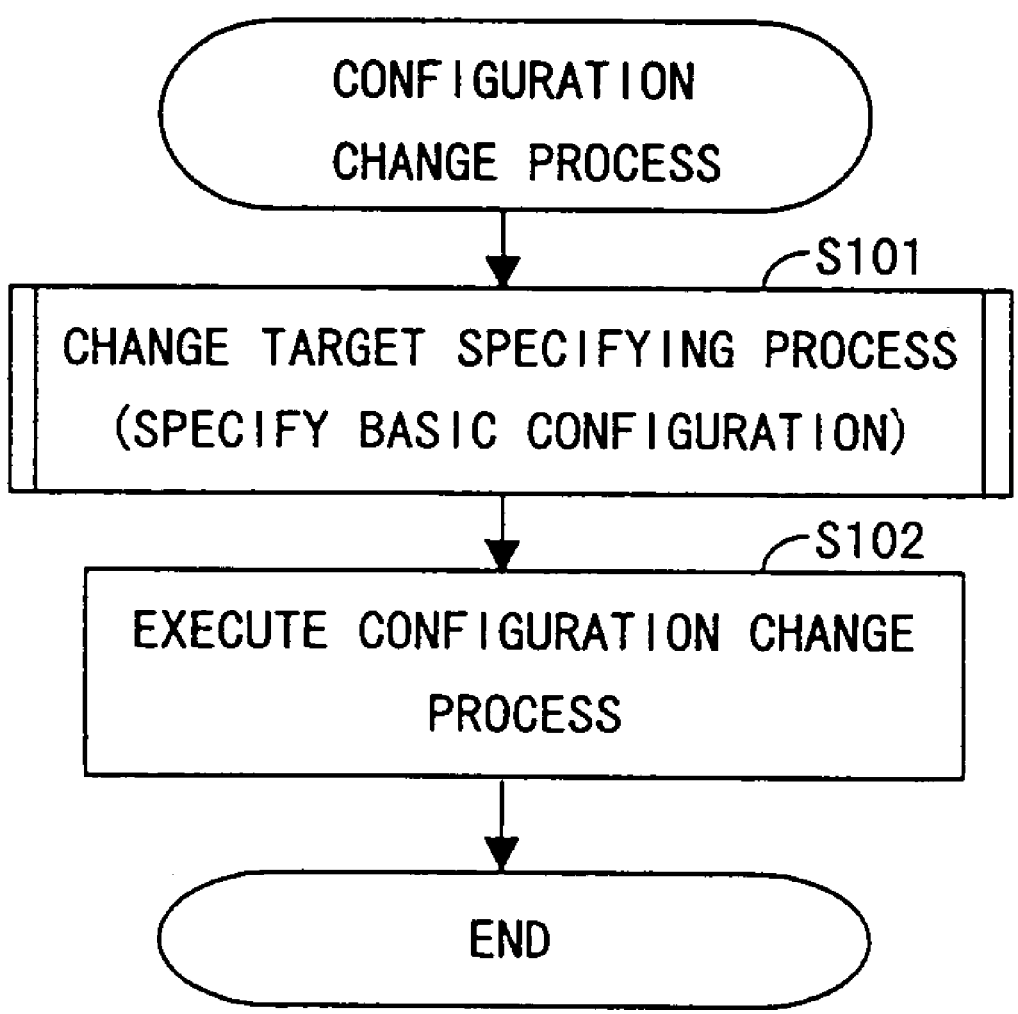
FIG. 13 is a flowchart showing a configuration change process.

A configuration change process will be explained with reference to a flowchart in FIG. 13. The configuration change process is a process of change one configuration of the basic configurations that form the three-dimensional configuration.

At first, the CPU executes the change target specifying process (S101). With this execution, the CPU makes the user specify the basic configuration to be changed.

Next, the CPU 3, in accordance with the user's operation of the mouse 6 or the input through the keyboard 5, changes the elements, e.g., a sectional shape, dimensions, etc. which form the specified basic configuration (S102). With this process, in the list structure shown in FIG. 4, two-dimensional configurations or depths of the corresponding elements are changed. Thereafter, the CPU 3 finishes the configuration change process.

<Attribute Change Process>

An attribute change process will be described referring to a flowchart in FIG. 14. The attribute change process connotes a process of changing attributes, e.g., a name, a category, an application method (arithmetic operation), a comment, etc. of one of the basic configurations forming the three-dimensional configuration.

At first, the CPU 3 executes the change target specifying process (S121). With this execution, the CPU makes the user specify the basic configuration to be changed.

Next, the CPU 3, according to the user's operation of the mouse 6 or the input through the keyboard 5, changes the attributes of the specified basic configuration (S122). With this process, in the list structure shown in FIG. 4, there are changed the name, the category, the application method (logic operation) the comment, etc. of the corresponding element. Thereafter, the CPU 3 finishes the attribute change process.

<Change Target Specifying Process>

The change target specifying process will be explained referring to a flowchart in FIG. 15. The change target specifying process is executed as a common module for specifying the change target in the combination sequence change process, the basic configuration deleting process, the display/non-display switching process, the basic configuration reproducing process, the configuration change process and the attribute change process.

In the change target specifying process, a start in-the-making configuration and an end in-the-making configuration are specified (which may be called a specification of a display range). In this specification, with respect to a feature tree, the user selects which range the in-the-making configuration is displayed in by use of the mouse 6. FIG. 16 shows an example of specifying the range based on the feature tree. In this feature tree, each basic configuration is indicated by a number for indicating the combination sequence and a name. For example, "1 Rectangular Parallelopiped S" implies that a basic configuration named a rectangular parallelopiped S is combined first. Further, "2 Round Hole Hi" implies that a basic configuration named a round hole Hi is combined second.

Referring to FIG. 16, rectangular cursors 41c, 41d are generated by the mouse pointer 40, whereby display ranges are selected. Each of the basic configurations embraced by the selected display ranges is framed by a bold line with a bold arrowhead indicating a combination sequence.

Note that if the start in-the-making configuration and the end in-the-making configuration are not specified, all the in-the-making configurations from the first basic configuration down to the last three-dimensional configuration are displayed as a default.

In the change target specifying process in this embodiment, a plurality of in-the-making configurations can be picked up from the in-the-making configurations displayed. For instance, in the combination sequence change process described above, the first in-the-making configuration for specifying the basic configuration of which the sequence is to be changed and the second in-the-making configuration for specifying the moving destination, are selected. Further, in the basic configuration deleting process, one in-the-making configuration for specifying the basic configuration as a deletion target is selected.

The change target specifying process for providing the function given above will be explained referring to FIG. 15. In the change target specifying process, the CPU 3, to start with, generates the basic configuration to be displayed at first (S200). Herein, if the display range described above is specified, the first in-the-making configuration thereof is displayed.

Whereas if not specified, among all the basic configurations shaping the three-dimensional configuration, a basic configuration corresponding to the head basic configuration element 31 in the list structure (FIG. 4), is displayed.

Moreover, the CPU 3 generates a basic configuration that should be combined next (S201). The basic configuration to be combined next is obtained by tracing the next basic configuration element 31 in the list structure shown in FIG. 4.

Next, the CPU 3 combines the basic configuration generated in S201 with the basic configuration (or the in-the-making configuration) generated in S200 (S202). In this combination, the logic operations (AND, OR, SUBTRACT) are executed based on the application method included in the basis configuration element 31 shown in FIG. 4.

Subsequently, the CPU 3 displays the three-dimensional configuration (which becomes a next in-the-making configuration) formed by combining the basic configurations (S203).

Next, the CPU 3 judges whether or not the next in-the-making configuration (S204). Namely, the CPU 3 judges whether or not all the in-the-making configurations in the display ranges are displayed. Next, if there is left the in-the-making configuration that should be displayed (Y in S204), the CPU 3 returns the control to S200. In the process in S200, the CPU 3 copies the in-the-making configuration displayed at the present, as a next in-the-making configuration. thereafter, the CPU 3 executes processes from S201 onward in the same way as the above-mentioned.

Subsequently, if there is not the in-the-making configuration that should be displayed (N in S204), the CPU indicates the user to select the in-the-making configuration (S205). This is attained by picking up a particular (or a final three-dimensional configuration) among the in-the-making configurations displayed by use of the mouse 6.

Next, the CPU 3 judges whether or not the next in-the-making configuration should be selected. For instance, when choosing one single in-the-making configuration, a judgement in S206 is No, and the processing comes to an end. On the other hand, when selecting two or more in-the-making configurations, the judgement in S206 continues to be Yes till a predetermined number of basic configurations are selected. In this case, after repeating the selection of the in-the-making configuration a predetermined number of times (S205), the CPU 3 finishes the process.

As discussed above, in the CAD system in this embodiment, the in-the-making configurations from the first basic configuration as a start configuration down to the last three-dimensional configuration, are displayed on the operation screen. Then, the present CAD system indicates the user to choose one of the in-the-making configurations displayed, and, with respect to the selected the in-the-making configuration, the basic configuration finally combined is set as a change target. Therefore, the user is able to grasp even the basic configuration invisible in the finally generated three-dimensional configuration, e.g., a basic configuration, etc. contained in a portion cut off by the sheet-cut, and thereafter specify the change target.

Further, as explained above, after displaying the in-the-making configurations, the user is made to perform the operations such as changing the combination change, deleting the basic configuration, switching the display/non-display, reproducing, changing the configuration, changing the attributes and so on, with respect to the change target basic configuration. Accordingly, there must be a less probability of inducing a mis-operation.

Moreover, the CAD system in this embodiment functions, in the change target specifying process, to specify the display range by use of the feature tree, and therefore a necessary graphic display time is reduced. As a result, the user is capable of efficiently change the three-dimensional configuration data.

<Modification of Basic Configuration Specifying Method>

In accordance with this embodiment, the CPU displays the plurality of in-the-making configurations. Then, the CPU 3 indicates the user to select the in-the-making configuration, and, in this selected in-the-making configuration, the basic configuration combined last time is specified as the change target basic configuration. The embodiment of the present invention is not, however, limited to the specifying method discussed above. For instance, the basic configuration visible in any one of the in-the-making configurations may be selected directly by the mouse 6, etc.

In the change target specifying process in this embodiment, all the in-the-making configurations existing in specified display ranges are displayed (see. E.g., FIG. 6). The embodiment of the present invention is not, however, confined to this method of displaying the in-the-making configuration. for example, the CAD system at first displays one single in-the-making configuration. Then, if this in-the-making configuration is not selected, after the in-the-making configuration displayed at the present has been deleted, a next in-the-making configuration may be displayed.

<Modification of Combination Sequence Change Process>

In the embodiment discussed above, the CPU 3 indicates the user to select the two in-the-making configurations, and changes the combination sequence (combination target) of the basic configuration specified from the first in-the-making configuration at the end of the second in-the-making configuration. The embodiment of the present invention is not, however, restricted to this combination sequence change process. for example, the user is made to select in the same way as the above, to begin with, the basic configuration specified from the first in-the-making configuration is set as a target of the combination sequence change (this is the same as what has been described above). Then, the combination sequence (combination target) may be set just before the second in-the-making configuration. As a consequence, the basic configuration specified from the first in-the-making configuration is combined with the end of the in-the-making configuration positioned one before the second in-the-making configuration.

<Readable-by-Computer Recording Medium>

In the embodiment discussed above, the hard disk 6 is used as a readable-by-computer recording medium for recording the program. The embodiment of the present invention is not, however, limited to this type of recording medium.

Herein, the readable-by-computer recording medium embraces recording mediums capable of storing information such as data, programs, etc. electrically, magnetically, optically and mechanically or by chemical action, which can be all read by the computer. What is demountable out of the computer among those recording mediums may be, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

<Data Communication Signal Embodied in Carrier Wave>

Furthermore, the three-dimensional CAD program and the three-dimensional configuration arithmetic module may be stored in the hard disk and the memory of the computer, and downloaded to other computers via communication media. In this case, the program is transmitted as data communication signals embodied in carrier waves via the communication media. Then, the computer downloaded with this program can be made to function as the CAD system explained in this embodiment.

Herein, the communication media may be classified into cable communication mediums (such as metallic cables including an optical communication cable, a coaxial cable and a twisted pair cable), and wireless communication media (such as satellite communications, ground wave wireless communications, etc.).

Further, the carrier waves are electromagnetic waves for modulating the data communication signals, and the light and DC signals are included therein. Accordingly, the data communication signal embodied in the carrier wave may be classified into a signal taking a modulated broadband waveform and a signal taking an unmodulated base band waveform. Namely, in the case of setting a DC signal having a voltage of 0 as a carrier wave, the data communication signal takes the base band waveform.

<Other Modified Examples>

In the embodiment discussed above, the keyboard 5 and the mouse 6 are used as the operation unit. The embodiment of the present invention is not, however, limited to these devices. For instance, a touch panel, a joystick or a trackball may also be used as an operation unit.

Moreover, in the embodiment discussed above, the CRT 7 is used for displaying the operation screen. The embodiment of the present invention is not, however, confined to the CRT 7 as a display device. For example, a liquid crystal display may also be used.

Further, in the embodiment discussed above, the cursor displayed on the operation screen is not restricted to the rectangle cursor. For instance, an arrowhead and a cross cursor may also be used as cursors.

What is claimed is:

1. A solid editing method in a three-dimensional CAD system, having a display screen and an operation unit for operating basic configurations displayed on said display screen, for completing a final three-dimensional configuration by an operation of combining a plurality of basic configurations, said method comprising:

displaying, on said display screen, in-the-making configurations from a first basic configuration as a start configuration down to the final three-dimensional configuration;

selecting one of the in-the-making configurations displayed; and setting as an edit target the basic configuration finally combined with respect to the selected in-the-making configuration;

wherein said method further comprises setting the edit target basic configuration in a non-display state or a display state from the non-display state with respect to the combination of the basic configurations for forming the final three-dimensional configuration.

2. A readable-by-computer recording medium that provides instructions for completing a final three-dimensional configuration by an operation of combining a plurality of basic configurations, which, when executed by a computer, cause the computer to perform operations comprising:

displaying, on a display screen, in-the-making configurations from a first basic configuration as a start configuration down to the final three-dimensional configuration;

selecting one of the in-the-making configurations displayed; and setting as an edit target the basic configuration finally combined with respect to the selected in-the-making configuration;

wherein said operations further comprise setting the edit target basic configuration in a non-display state or a display state from the non-display state with respect to the combination of the basic configurations for forming the final three-dimensional configuration.

3. A readable-by-computer recording medium recorded with a program according to claim 2, wherein said program further comprises deleting the edit target basic configuration from the combination of the basic configuration forming the final three-dimensional configuration.

4. A readable-by-computer recording medium recorded with a program according to claim 2, wherein said program further comprises changing the edit target configuration.

5. The readable-by computer recording medium recorded with the program according to claim 2, wherein said program further comprises generating a sum of the basic configurations, a difference between the basic configurations, and a product of the basic configurations.

6. A readable-by-computer recording medium recorded with a program for indicating a computer to edit a three-dimensional configuration formed by sequentially combining basic configurations, said program comprising:

displaying, on said display screen, in-the-making configurations from a first basic configuration as a start configuration down to the final three-dimensional configuration;

selecting a first one of the in-the-making configurations displayed; and setting as an edit target a basic configuration finally combined with respect to the first selected in-the-making configuration, wherein said selecting further includes selecting a second in-the-making configuration, and the program further comprises changing a combination sequence of the basic configuration set as the edit target with the selection of the first in-the-making configuration, to just posterior or just anterior to the second in-the-making configuration;

wherein said program further comprises setting the edit target basic configuration in a non-display state or a display state from the non-display state with respect to the combination of the basic configurations for forming the final three-dimensional configuration.

7. A readable-by-computer recording medium that provides instructions for completing a final three-dimensional configuration by an operation of combining a plurality of basic configurations, which, when executed by a computer, cause the computer to perform operations comprising:

displaying, on a display screen, in-the-making configurations from a first basic configuration as a start configuration down to the final three-dimensional configuration, wherein the three-dimensional configuration is stored in the form of element data representing the basic configurations, and sequence indicating data representing a combination sequence of plural items of element data;

selecting a first displayed in-the-making configuration and a second displayed in-the-making configuration;

setting as an edit target a basic configuration finally combined with respect to the selected first displayed in-the-making configuration; and changing the combination sequence of the basic configuration set as the edit target with the selection of the first displayed in-the-making configuration, to just posterior or just anterior to the second displayed in-the-making configuration, and changing the sequence indicating data representing the combination sequence of plural items of element data, wherein said operations further comprise setting the edit target basic configuration in a non-display state or a display state from the non-display state with respect to the combination of the basic configurations for forming the final three-dimensional configuration.

8. A readable-by-computer recording medium recorded with a program that provides instructions for completing a final three-dimensional configuration by an operation of combining a plurality of basic configurations, which, when executed by a computer, causes the computer to perform operations comprising:

displaying, on a display screen, in-the-making configurations from a first basic configuration as a start configuration down to the final three-dimensional configuration;

selecting one of the in-the-making configurations displayed; and setting as an edit target the basic configuration finally combined with respect to the selected in-the-making configuration to claim 2, wherein said program further comprises setting the edit target basic configuration in a non-display state or a display state from the non-display state with respect to the combination of the basic configurations for forming the final three-dimensional configuration.

9. A readable-by-computer recording medium recorded with a program that provides instructions for completing a final three-dimensional configuration by an operation of combining a plurality of basic configurations, which, when executed by a computer, causes the computer to perform operations comprising:

displaying, on a display screen, in-the-making configurations from a first basic configuration as a start configuration down to the final three-dimensional configuration;

selecting one of the in-the-making configurations displayed; and setting as an edit target the basic configuration finally combined with respect to the selected in-the-making configuration, wherein said selecting includes selecting the first in-the-making configuration and the second in-the-making configuration, and the program further comprises reproducing the basic configuration set as the edit target due to the first in-the-making configuration, to the second in-the-making configuration.

10. A readable-by-computer recording medium recorded with a program that provides instructions for completing a final three-dimensional configuration by an operation of combining a plurality of basic configurations, which, when executed by a computer, causes the computer to perform operations comprising:

displaying, on a display screen, in-the-making configurations from a first basic configuration as a start configuration down to the final three-dimensional configuration;

selecting one of the in-the-making configurations displayed; and setting as an edit target the basic configuration finally combined with respect to the selected in-the-making configuration, wherein the basic configuration is attached with attributes, and said program further comprises editing the attributes of the edit target.

11. A solid editing method in a three-dimensional CAD system for editing a three-dimensional configuration formed by sequentially combining basic configurations, said method comprising:

displaying in-the-making configurations from a first basic configuration as a start configuration down to a final three-dimensional configuration;

selecting a basic configuration visible in the in-the-making configuration displayed; and setting the selected basic configuration as an edit target;

wherein said method further comprises setting the edit target basic configuration in a non-display state or a display state from the non-display state with respect to the combination of the basic configurations for forming the final three-dimensional configuration.

12. A readable-by-computer recording medium recorded with a program for indicating a computer to edit a three-dimensional configuration formed by sequentially combining basic configurations, said program comprising:

displaying in-the-making configurations from a first basic configuration as a start configuration down to a final three-dimensional configuration;

selecting a basic configuration visible in the in-the-making configuration displayed; and setting the selected basic configuration as an edit target;

wherein said program further comprises setting the edit target basic configuration in a non-display state or a display state from the non-display state with respect to the combination of the basic configurations for forming the final three-dimensional configuration.

13. A method, comprising:

receiving a designation of a three-dimensional CAD configuration from a user;

displaying a sequence of a plurality of in-the-making CAD configurations generating the designated three-dimensional CAD configuration;

receiving a designation of one of the plurality of in-the-making CAD configurations from the user; and selecting the designated one of the plurality of in-the-making CAD configurations as an edit target;

wherein said method further comprises setting the edit target basic configuration in a non-display state or a display state from the non-display state with respect to the combination of the basic configurations for forming the final three-dimensional configuration.

14. The method of claim 13, further comprising:

receiving a designation of an edit method option from the user relating to the displayed sequence of the plurality of in-the-making CAD configurations.

15. The method of claim 14, further comprising:

receiving a designation of an edit operation pursuant to the designated edit method from the user;

editing the designated three-dimensional CAD configuration via the displayed sequence of the plurality of in-the-making CAD configurations pursuant to the designated edit operation; and displaying the edited three-dimensional CAD configuration.

* * * * *

UNITED STATES PATENT AND TRADEMARK OFFICE
CERTIFICATE OF CORRECTION

PATENT NO. : 6,995,760 B1
APPLICATION NO. : 09/639763
DATED : February 7, 2006
INVENTOR(S) : Atsushi Horiike It is certified that error appears in the above-identified patent and that said Letters Patent is hereby corrected as shown below:

Column 15, line 37, Claim 5, replace "readable-by computer" with --readable-by-computer--, therefor;

Column 16, line 22, Claim 7, replace "data," with --data;--, therefor;

Column 16, line 42, Claim 8, after "configuration" delete "to claim 2".

Signed and Sealed this

Eleventh Day of July, 2006

JON W. DUDAS
*Director of the United States Patent and Trademark Office*